United States Patent
Schneider (10) Patent No.: US 8,904,521 B2
(45) Date of Patent: Dec. 2, 2014

(54) CLIENT-SIDE PREVENTION OF CROSS-SITE REQUEST FORGERIES

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 511 days.

(21) Appl. No.: 12/627,864

(22) Filed: Nov. 30, 2009

(65) Prior Publication Data

US 2011/0131635 A1     Jun. 2, 2011

(51) Int. Cl.
*H04L 29/06* (2006.01)
*H04L 29/08* (2006.01)

(52) U.S. Cl.
CPC .............. *H04L 63/1441* (2013.01); *H04L 67/02* (2013.01); *H04L 63/168* (2013.01)
USPC .............. 726/22; 726/1; 726/2; 726/3; 726/4; 726/7; 726/21; 726/26; 726/27; 726/28; 726/29; 726/30; 713/165; 713/167; 713/168; 713/182; 709/217; 709/219; 709/224; 709/225; 709/226; 709/229

(58) Field of Classification Search
USPC .................... 726/1–10, 21–30; 713/164–181; 709/217–229
See application file for complete search history.

(56) References Cited

U.S. PATENT DOCUMENTS

| | | | |
|---|---|---|---|
| 6,105,012 A | 8/2000 | Chang et al. | |
| 6,505,300 B2 * | 1/2003 | Chan et al. | 713/164 |
| 7,454,622 B2 | 11/2008 | Laidlaw et al. | |
| 7,478,434 B1 | 1/2009 | Hinton et al. | |
| 7,500,099 B1 | 3/2009 | McElwee | |
| 7,565,135 B2 | 7/2009 | Patel | |
| 7,984,500 B1 * | 7/2011 | Khanna et al. | 726/22 |
| 8,264,721 B2 | 9/2012 | Oomura et al. | |
| 2002/0099936 A1 | 7/2002 | Kou et al. | |
| 2003/0182549 A1 * | 9/2003 | Hallin et al. | 713/156 |
| 2005/0050364 A1 | 3/2005 | Feng et al. | |
| 2005/0183142 A1 * | 8/2005 | Podanoffsky | 726/18 |
| 2007/0143614 A1 | 6/2007 | Holtmanns | |
| 2008/0028447 A1 * | 1/2008 | O'Malley et al. | 726/6 |
| 2008/0077794 A1 | 3/2008 | Arnold et al. | |
| 2008/0082602 A1 * | 4/2008 | Morikawa | 709/203 |
| 2008/0083032 A1 * | 4/2008 | Yamaoka | 726/22 |
| 2008/0115201 A1 | 5/2008 | Sturms et al. | |
| 2008/0222736 A1 * | 9/2008 | Boodaei et al. | 726/27 |
| 2008/0263650 A1 * | 10/2008 | Kerschbaum | 726/9 |

(Continued)

OTHER PUBLICATIONS

Cross-Site Request Forgeries: Exploitation and Prevention by Zeller et al; Publisher: Princeton University; Year: 2008.*

(Continued)

*Primary Examiner* — Madhuri Herzog
(74) *Attorney, Agent, or Firm* — Lowenstein Sandler LLP (57) ABSTRACT

Cross-site request forgeries ("XSRF") can be prevented using a client-side plugin on a client computer. The client computer accesses a content provided by a third party host via a network and generates a request to a web application as directed by the content. The client-side plugin determines whether the request is associated with suspicious activities based on the content, a source of the request and a list of approved hosts associated with the target host. In response to a determination that the request is associated with suspicious activities, the plugin removes authentication credentials from the request and sends the request to the web application.

18 Claims, 4 Drawing Sheets

(56) References Cited

U.S. PATENT DOCUMENTS

| | | | |
|---|---|---|---|
| 2008/0320567 A1* | 12/2008 | Shulman et al. | 726/4 |
| 2009/0144546 A1 | 6/2009 | Jancula | |
| 2010/0088752 A1 | 4/2010 | Nagulakonda et al. | |
| 2010/0088761 A1* | 4/2010 | Podjarny et al. | 726/22 |
| 2010/0235918 A1* | 9/2010 | Mizrahi et al. | 726/25 |
| 2010/0299732 A1 | 11/2010 | Zhang et al. | |
| 2011/0055391 A1 | 3/2011 | Schneider | |
| 2011/0131416 A1 | 6/2011 | Schneider | |

OTHER PUBLICATIONS

Defeating Cross-Site Request Forgery Attacks with Browser-Enforced Authenticity Protection by Mao et al; Publisher: Springer-Verlag Berlin Heidelberg; Date: Feb. 23-26, 2009.*

Browser Protection against Cross-Site Request Forgery by Maes et al; Publisher: ACM: Date: Nov. 9, 2009.*

Cross-Site Request Forgeries by Chris Shiflett; Publisher: shiflett. org; Date: Dec. 13, 2004.*

Defeating Cross-Site Request Forgery Attacks with Browser-Enforced Authenticity Protection by Mao et al; Publisher: Springer Berlin Heidelberg; Date: Feb. 2009.*

Preventing Cross Site Request Forgery Attacks by Jovanovic et al: Publisher: IEEE; Year: 2006.*

Robust Defenses for Cross-Site Request Forgery by Barth et al; Publisher: ACM; Date: Oct. 2008.*

SOMA: Mutual Approval for Included Content in Web Pages by Oda et al; Publisher: ACM; Date: Oct. 2008.*

Burns, Jesse, Cross Site Request Forgery, An Intorductin to a Common Web Application Weakness © 2005, 2007, Information Security Partners, LLC. Https://www.isecpartners.com/, 9 pages.

Menezes, et al., Handbook of Applied Cryptography, Publisher: CRC Press LLC; 1997.

Red Hat Office Action for U.S. Appl. No. 12/551,352, mailed May 4, 2012.

Red Hat Office Action for U.S. Appl. No. 12/628,121, mailed Jan. 30, 2012.

Red Hat Office Action for U.S. Appl. No. 12/628,121, mailed Jul. 9, 2012.

Red Hat Office Action for U.S. Appl. No. 12/551,352, mailed Dec. 5, 2012.

Red Hat Office Action for U.S. Appl. No. 12/551,352, mailed May 20, 2013.

Red Hat Office Action for U.S. Appl. No. 12/551,352, mailed Aug. 27, 2013.

Red Hat Office Action for U.S. Appl. No. 12/551,352, mailed Mar. 8, 2013.

Red Hat Office Action for U.S. Appl. No. 12/551,352, mailed Aug. 9, 2013.

Red Hat Advisory Action for U.S. Appl. No. 12/628,121, mailed Oct. 21, 2013.

* cited by examiner

CLIENT-SIDE PREVENTION OF CROSS-SITE REQUEST FORGERIES

TECHNICAL FIELD

Embodiments of the present invention relate to computing systems, and more particularly, to the security of web applications.

BACKGROUND

Cross-site request forgery (XSRF) is a class of attacks that depend on the inaccurate assumption made by most "secure" web applications that proof of identity is equivalent to proof of intent. This vulnerability is implicit in the way web browsers operate, and it is worsened by scripting languages embedded in the browser.

For example, a vulnerable site may host a web application where a client has current, active authentication credentials. If an attacker can induce the client's web browser to submit a request to the vulnerable site, the attack can occur without any active participation by the user of the client. The user of the client may not even be aware of the activity until well after the fact. In one scenario, the request that the client's web browser is tricked into submitting may be a request to a bank for transferring money from the user's account to the attacker's account.

When executed properly, an attack can be virtually undetectable. Given the appropriate circumstances, victims may not see any evidence of illegitimate activities in their browser window. From the logs of the vulnerable web application, it typically looks like a completely intentional transaction. Victims normally cannot even prove that they are victims. By destroying the trust required for commerce to function, it is possible that this problem will completely undermine web commerce.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for prevention of cross-site request forgeries ("XSRF") using a client-side plugin. In one embodiment, the client computer accesses a content provided by a third party host via a network and generates a request to a web application as directed by the content. The client-side plugin determines whether the request is associated with suspicious activities based on the content, a source of the request and a list of approved hosts associated with the target host. In response to a determination that the request is associated with suspicious activities, the plugin removes authentication credentials from the request and sends the request to the web application.

Cross-site request forgeries occur because web applications make the assumption that an authenticated request is intentional. By "authenticated," it means that the request was provided with information sufficient for the web application to unambiguously determine the account associated with the request. This account may be a site login account, a financial account associated with a site login account (e.g., a bank account or a mortgage account), etc.

Figure 1:
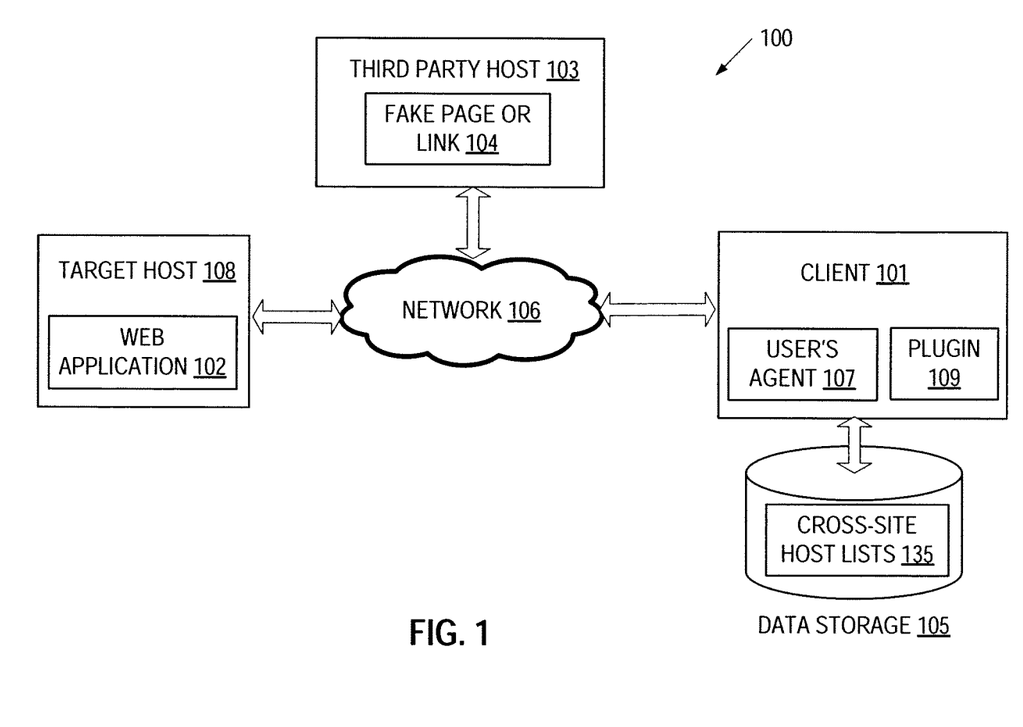
FIG. 1 is a block diagram of a computer system in which embodiments of the invention may be implemented.

FIG. 1 illustrates a network architecture 100 in which an XSRF attack may occur. The entities involved in the attack include a user's agent 107, a "secure" or "authenticated" web application 102, and an attacker (shown in FIG. 1 as a third party host 103), all of which communicate via a network 106, such as a public network (e.g., Internet) or a private network (e.g., Ethernet or a local area Network (LAN)).

The first entity, which is the user's agent 107, resides in a client machine 101 ("client") and interacts with the web application 102. The user's agent 107 may be a web browser, a web-aware email application (e.g., Microsoft Outlook® or Mozilla Thunderbird®), etc. The user's agent 107 has obtained authentication credentials that can be used to prove the user's identity to the web application 102. In one embodiment, the user's agent 107 may obtain the authentication credentials from the user of the client 101 (e.g., username and password) and/or from the web application 102 with which the user has been authenticated (e.g., a session cookie). The client 101 may be a computing system, for example, workstations, personal computers (PCs), mobile phones, palm-sized computing devices, personal digital assistants (PDAs), etc.

The second entity, which is the web application 102, resides at a target host 108 that may include one or more server machines. The web application 102 may solicit authentication credentials from the user's agent 107 for every request (e.g., through the Hypertext Transfer Protocol (HTTP) 401 "authentication required" status code), solicit the credentials at the beginning of a series of interactions, or otherwise solicit proof of valid credentials. In one embodiment, after authenticating the credentials, the web application 102 issues an authentication token (e.g., a session cookie) for the client 101 to use as a proxy for the original credentials.

The third entity, which is the attacker (e.g., the third party host 103), wishes to induce the web application 102 to take an action that the user's agent 107 would be authorized to request, if the request is associated with the appropriate authentication credentials. In one scenario, the attacker may post or send a specially crafted content to the user, such as a fake page or link 104. The specially crafted content may also include Flash animations or movies. The fake page or link 104 can be hosted by the third party host 103, which may include one or more server machines, or a distributed system. In one embodiment, the third party host 103 is an email message sent to the user. The action that the web application 102 is induced to take upon receiving the user's request may include adding user names to a list of site administrators, changing text in a content management system (e.g., to deface a website, or get the victim in trouble for making inappropriate changes), transfer funds to another bank account, or other malicious actions.

In one scenario, the attacker induces the user to view a page (e.g., the fake page or link 104) via the user's agent 107. The page includes specifically crafted code (e.g., JavaScript code, Hypertext Markup Language (HTML), and/or code associated with custom HTTP headers). The JavaScript, HTML, or HTTP headers induce the user's agent 107 to make the desired request without the intervention or intention of the user. In some scenarios, this inducement may be in the form of a specially crafted email message. The user may trigger the attack by just viewing the email.

When the attack is triggered (e.g., by the user viewing a page, clicking on a link, opening an email, etc.), the user's agents 107 will interpret or execute the specifically crafted code, and make the request under the direction of the attacker to the web application 102 without the user's knowledge. The attack works if the client 101 has an ongoing authenticated session with the web application 102 (e.g., the client 101 has an open web browser window connecting to the hosting site of the web application 102) at the same time that the attack is triggered. Upon receiving the request from the user's agents 107, the web application 102 solicits authentication credentials (e.g., username, password, the previously-issued session cookie, etc.) from the user's agent 107 (e.g., through the HTTP 401 "authentication required" status code). A conventional user's agent having no protection against XSRF attacks would automatically provide the solicited credentials without the user's knowledge. From the viewpoint of the web application 102, the request from the conventional user's agent would be completely legitimate.

According to one embodiment of the present invention, a user-agent plugin 109 ("plugin") is installed in the client 101. The plugin 109 can examine the kinds of requests, and disallow those kinds of requests that would enable an XSRF attack to succeed. In particular, the plugin examines the source of the request, compares the source of the request with the approved hosts in cross-site host lists 135, and strips out authentication credentials from the request when it determines that the request is suspicious. The removed authentication credentials may include one or more of the following: in a session cookie that was previously issued by the web application; all cookies that were previously issued by the web application; and username and password information previously solicited by the web application in response to an HTTP "authentication required" error, etc. Operations of the plugin 109 will be described in greater detail with reference to FIG. 2. In one embodiment, the cross-site host lists 135 are stored in data storage 105 coupled to the client 101. The data storage 105 may include memory devices (e.g., random access memory (RAM)), flash drives, hard drives or mass storage devices.

Figure 2:
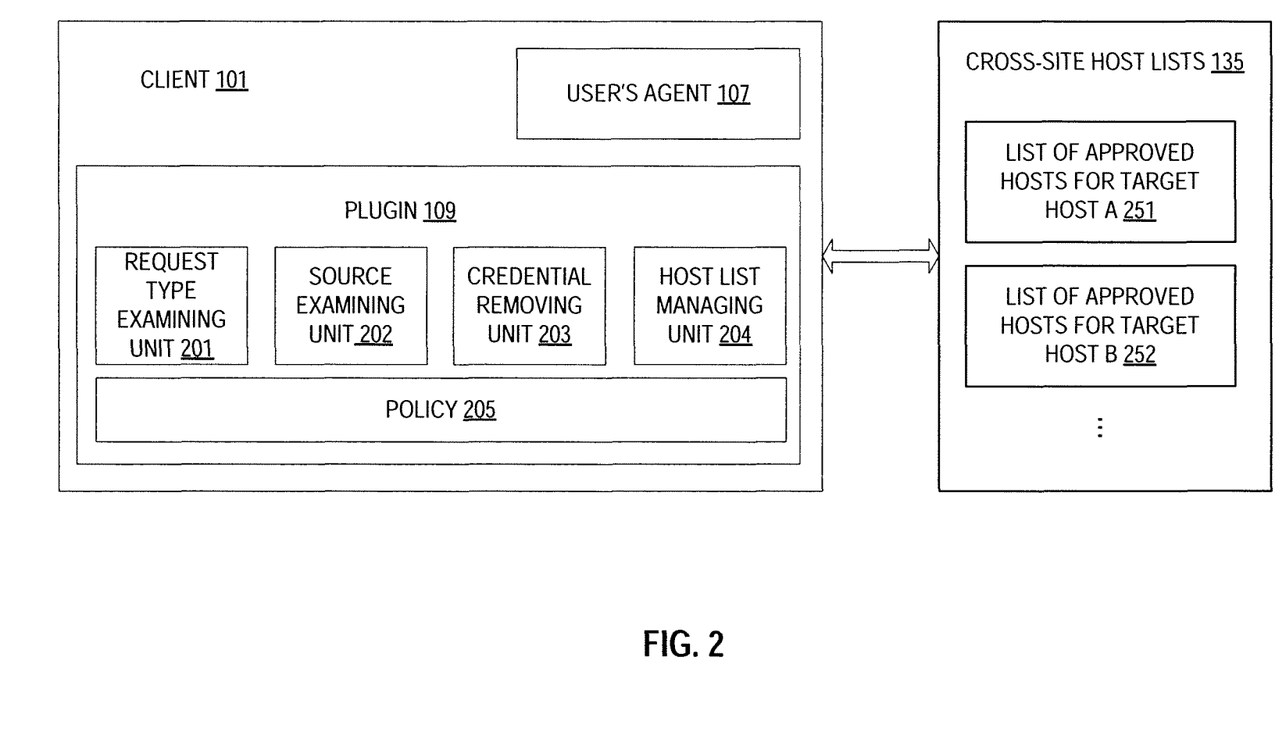
FIG. 2 is a block diagram of one embodiment of a client-side plugin.

FIG. 2 is a block diagram of one embodiment of the client 101 that includes the user's agent 107 and the plugin 109. In one embodiment, the plugin 109 includes a request type examining unit 201, a source examining unit 202, a credential removing unit 203 and a host list managing unit 204. The host list managing unit 204 is responsible for requesting a list of approved hosts from each of the target hosts (i.e., web application hosting sites) with which the user's agent 107 interacts. In one embodiment, at the first time the client 101 interacts with a target host, the host list managing unit 204 requests a list of approved hosts from the target host. The "approved hosts" on the list may include the name, address, or other identifier of the hosts that the target host trusts. In some scenarios, a target host may allow email messages to be considered as "approved hosts." In these scenarios, the list of approved hosts associated with the target host may also include identifiers for certificates that can be accepted to authenticate email messages that it would consider "approved." The identifier is typically the certificate name of the issuer and subject, but it could be the issuer's certificate name and a list of acceptable serial numbers. For example, the issuer and subject name may likely be presented in a format like this: /C=US/O=RSA Data Security, Inc./OU=Secure Server Certification Authority.

The host list managing unit 204 also updates the list as specified by the target host (e.g., periodically or at a specific expiration time). The host list managing unit 204 may manage separate lists for different target hosts; e.g., a list of approved hosts 251 for a target host A, a list of approved hosts 252 for a target host B, etc. In one embodiment, the cross-site host lists 135 (including the lists 251, 252, etc.) may take the form of a document (e.g., an Extensible Markup Language (XML) document) attached to a cryptographic signature. The signature may be produced by the key associated with the target host's X.509 certificate that is used to authenticate its HTTPS connections.

In one embodiment, the request type examining unit 201 examines the type of code that triggers the request. For example, the request may be initiated from a form, initiated in response to an HTTP redirect or a simulated HTTP redirect (using <meta> tags in an HTML document), initiated by the action of a script or an unsigned applet or plugin, initiated by the submission of a form that is not visible to the user from a display on the user's agent 107, from an unsigned email, etc.

The source examining unit 202 may identify the source of the request as a host that is different from the target host (i.e., the host providing the web application), and/or a host that is not on the list of the approved hosts associated with the target host. Based on the type of code and the source of the request, the plugin 109 determines whether the request is suspicious using a policy 205. The policy 205 may be configured and updated by a user or a system administrator to include a number of scenarios that raise a security red flag. If the request is determined to be suspicious, the credential removing unit 203 removes the authentication credentials from the request, and the user's agent 107 sends the request to the web application 102 without the authentication credentials.

When receiving the request without the credentials, the target host 108 may reject the request, allow the request with limited access permission, or generate a warning message, etc. A system administrator of the target host 108 may later examine the log and discover that a large number of requests that should have been sent with credentials were sent without the credentials. Thus, with the use of the plugin 109, the XSRF attacks will leave a detectable trail that indicates possible attack activities.

Figure 3:
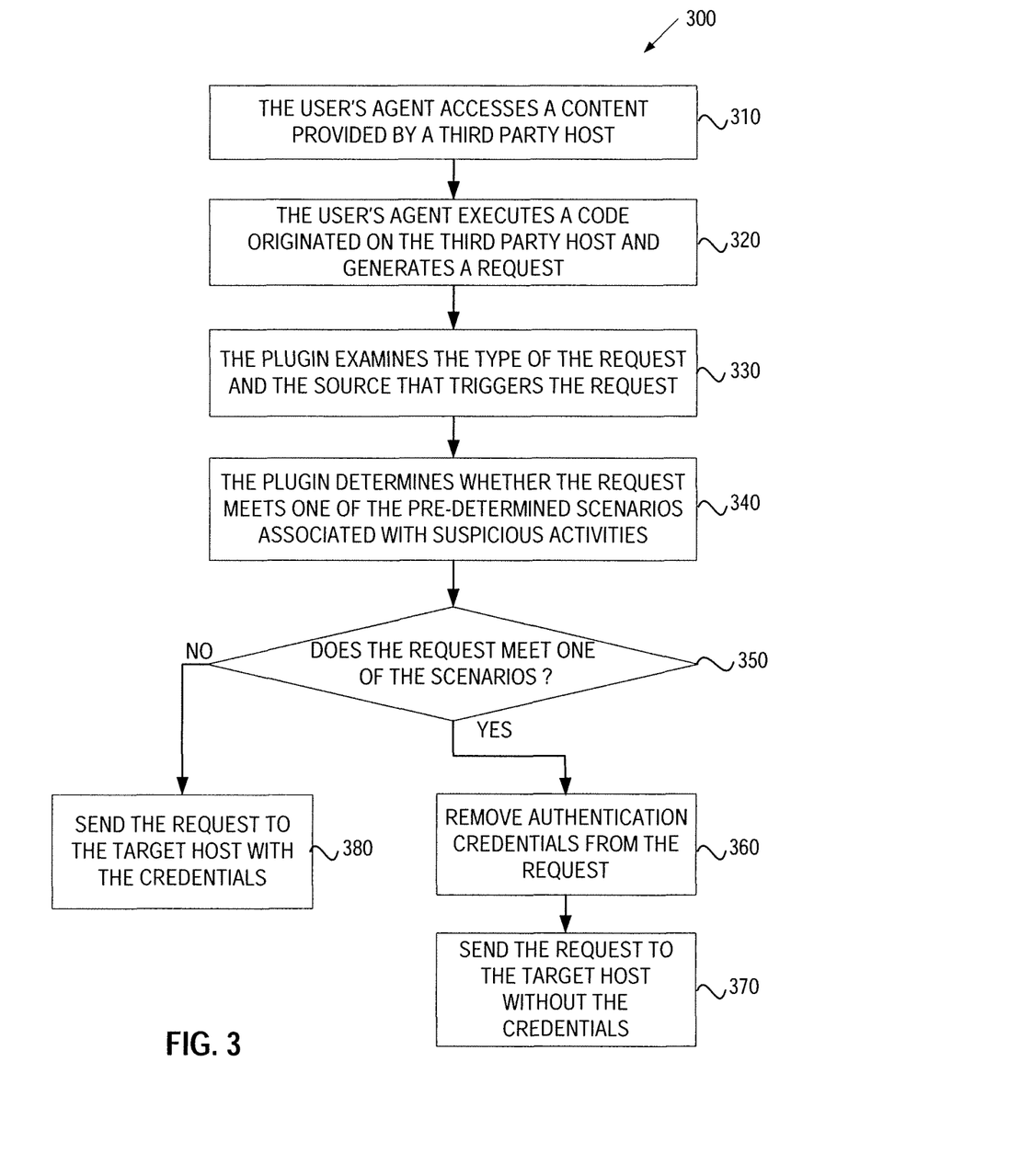
FIG. 3 is a flow diagram of one embodiment of a method for preventing cross-site request forgeries.

FIG. 3 is a flow diagram illustrating one embodiment of a method 300 for preventing an XSRF attack. The method 300 may be performed by computer system 400 of FIG. 4 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the client 101 FIGS. 1 and 2, which have access to cross-site host lists 135 and is capable of detecting suspicious activities.

Referring to FIG. 3, in one embodiment, the method 300 begins when the user's agent 107 accesses a content provided by a third party host (e.g., the third party host 103). For example, the user's agent 107 may be retrieving a web page, loading an image file, accessing a web link, opening an email, etc. Within the content accessed by the user's agent 107, a specially crafted code is embedded (block 310). As the code is in the content that is provided directly or indirectly by the third party host, the code is said to be originated on the third party host 103 (that is, the code may be hosted by the third party host 103 or hosted by a site that is redirected to by the third party host 103). The code may be in the form of a script, an unsigned applet, a form, a redirect, etc. Executing the code by the user's agent 107 causes the user's agent to make a request to the target host 108 of the web application 102 without the knowledge of the user (block 320).

Before submitting the request to the target host 108, the plugin 109 in the client 101 examines the type of code that triggers the request (e.g., whether the code that triggers the request is a script, an unsigned applet, a form, a redirect, an unsigned email, etc.) and the source that triggers the request (e.g., the third party host 103) (block 330). In one embodiment, the plugin 109 also determines whether the source that triggers the request is on the list of approved hosts associated with the target host 108.

In one embodiment, the plugin 109 determines whether the request meets one of the pre-determined scenarios that are associated with suspicious activities (block 340). For example, the plugin 109 may check whether at least one of the following scenarios is true:

1) The request was initiated from a form that was hosted by a third party host other than the target host 108, and the third party host is not on the list of approved hosts associated with the target host 108. Thus, the source of the form is to be examined and checked against its target. If the form originates from a host on the target's approved host list, the credentials can be sent with the request. Since a form can be generated programmatically via JavaScript, the source of the form may need to be traced to the source of the JavaScript that generates it.

2) The request was initiated in response to an HTTP redirect or a simulated HTTP redirect (using <meta> tags in an HTML document), and the source of the redirect is a third party host other than the target host 108, and the third party host is not on the list of approved hosts associated with the target host 108.

3) The request was initiated by the action of a script, an unsigned applet, or a plugin, which originated on a third party host other than the target host 108, and the third party host is not on the list of approved hosts associated with the target host 108.

4) The request was initiated by the submission of a form that would not be visible to the user from any possible display on the user's agent 107, and the request was initiated without an action made by the user that specifically indicated that the user was making a request (e.g., pressing a button or clicking on a link).

5) The request was initiated by opening an unsigned email message. Under no conditions would an unsigned email message be considered an approved cross-site host. In one embodiment, the only email messages that can be considered as an approved cross-site host are those email messages signed with a signature that can be verified using the certificate identified in the list of approved hosts associated with the target host 108.

6) Any request that is not visible to the user in the ordinary course of operation is suspect. This includes the loading of images, JavaScript libraries, CSS stylesheets, Java applets, Flash animations, etc. That is, anything that causes the browser to automatically request something needs to be examined.

In one embodiment, each of the above scenarios may be stored as a policy (e.g., the policy 205) on the client 101. The plugin 109 examines the requests according to the policy. The policy may be updated by the user or a system administrator to include additional scenarios in which the type and source of the requests are considered suspicious.

If any one of the above scenario is true (block 350), the request is considered to be associated with suspicious activities. Thus, the plugin 109 removes authentication credentials from the request (block 360). The client 101 then sends the request to the target host 108 without the credentials (block 370). Otherwise, if the request is not considered to be associated with suspicious activities (i.e., the request is considered legitimate), the client 101 sends the request to the target host 108 with the credentials (block 380).

Figure 4:
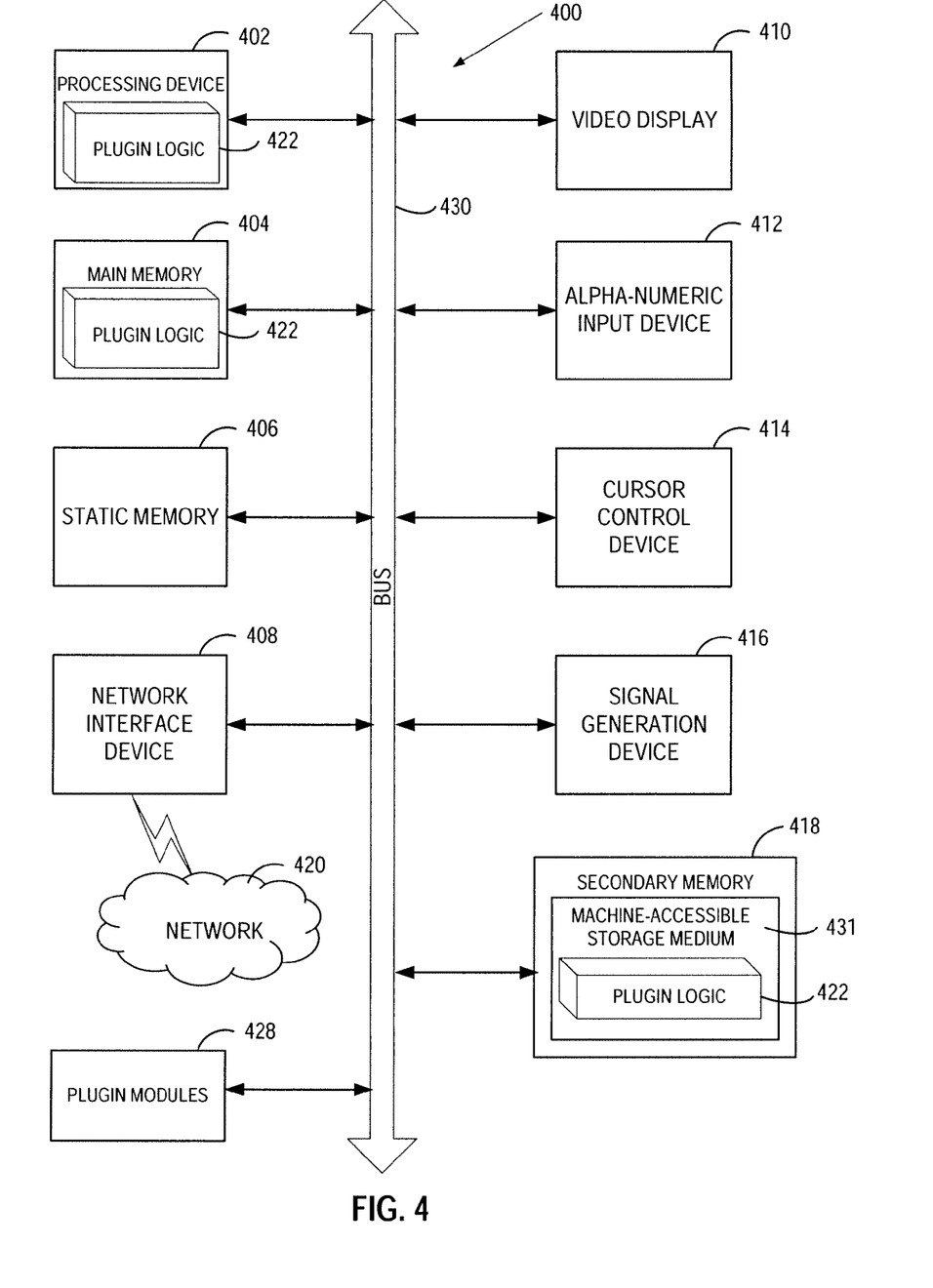
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the plugin logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., plugin logic 422) embodying any one or more of the methodologies or functions described herein (e.g., the plugin 109 of FIGS. 1 and 2). The plugin logic 422 may also reside, completely or at least partially, within the main memory 404 and/or within the processing device 402 during execution thereof by the computer system 400; the main memory 404 and the processing device 402 also constituting machine-readable storage media. The plugin logic 422 may further be transmitted or received over a network 420 via the network interface device 408.

The machine-readable storage medium 431 may also be used to store the plugin logic 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 400 may additionally include plugin modules 428 for implementing the functionalities of the plugin 109 of FIGS. 1 and 2. The modules 428, components and other features described herein (for example in relation to FIG. 1) can be implemented as discrete hardware components or integrated in the functionality of hardware components such as ASICS, FPGAs, DSPs or similar devices. In addition, the modules 428 can be implemented as firmware or functional circuitry within hardware devices. Further, the modules 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "accessing", "determining", "generating", "removing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   accessing, by a client computer, a content provided by a first host via a network;
   generating by the client computer, as directed by the content, a request to a web application that is hosted by a second host, wherein the second host is different than the first host;
   requesting, by the client computer, from the second host, a first list of approved hosts associated with the second host;
   updating a second list of approved hosts stored on the client computer in view of the first list of approved hosts associated with the second host;
   determining, by the client computer, whether the request is associated with suspicious activities in view of the content, the first host, and the second list of approved hosts; and
   in response to a determination that the request is associated with suspicious activities, removing authentication credentials from the request and submitting the request to the web application.

2. The method of claim 1, wherein the request is determined to be associated with suspicious activities when the first host is not on the second list of approved hosts.

3. The method of claim 1, wherein the first list of approved hosts comprises a document attached to a cryptographic signature produced by the second host.

4. The method of claim 1, wherein removing authentication credentials from the request comprises at least one of:
   removing a session cookie that was previously issued by the web application;
   removing all cookies that were previously issued by the web application; or removing username and password information previously solicited by the web application in response to an HTTP authentication required error.

5. The method of claim 1, wherein the request is determined to be associated with suspicious activities when the request is triggered by an unsigned email message.

6. The method of claim 1, wherein the request is determined not to be associated with suspicious activities when the request is triggered by a signed email message that is signed by a key associated with a host on the first list of approved hosts.

7. The method of claim 1, wherein the request is determined to be associated with suspicious activities when the request is initiated by a submission of a form that is not visible to a user of the client computer and the request is initiated without an action by the user.

8. A system comprising:
data storage to store a first list of approved hosts associated with a second host, the second host to host a web application; and
a client computer, coupled to the data storage, to:
access a content provided by a first host via a network,
generate a request as directed by the content to the web application, wherein the first host is different than the second host,
request, from the second host, a second list of approved hosts associated with the second host,
update the first list of approved hosts stored on the client computer in view of the second list of approved hosts associated with the second host,
determine whether the request is associated with suspicious activities in view of the content, the first host, and the first list of approved hosts, and
when it is determined that the request is associated with suspicious activities,
remove authentication credentials from the request and submit the request to the web application.

9. The system of claim 8, wherein the request is determined to be associated with suspicious activities when the first host is not on the second list of approved hosts.

10. The system of claim 8, wherein the second list of approved hosts comprises a document attached to a cryptographic signature produced by the second host.

11. The system of claim 8, wherein the authentication credentials comprises at least one of:
a session cookie that was previously issued by the web application;
all cookies that were previously issued by the web application; or
username and password information previously solicited by the web application in response to an HTTP authentication required error.

12. The system of claim 8, wherein the request is determined not to be associated with suspicious activities when the request is triggered by a signed email message that is signed by a key associated with a host on the first list of approved hosts.

13. The system of claim 8, wherein the accessing of the content is via a web browser or an email application.

14. A non-transitory computer readable storage medium comprising instructions that, when executed by a client computer, cause the client computer to perform operations comprising:
accessing by the client computer, via a network, a content provided by a first host;
generating by the client computer, as directed by the content, a request to a web application that is hosted by a second host, wherein the second host is different than the first host;
requesting, from the second host, a first list of approved hosts associated with the second host;
updating a second list of approved hosts stored on the client computer in view of the first list of approved hosts associated with the second host;
determining whether the request is associated with suspicious activities in view of the content, the first host, and the second list of approved hosts; and
in response to a determination that the request is associated with suspicious activities, removing authentication credentials from the request and submitting the request to the web application.

15. The non-transitory computer readable storage medium of claim 14, wherein the request is determined to be associated with suspicious activities when the first host is not on the second list of approved hosts.

16. The non-transitory computer readable storage medium of claim 14, wherein the first list of approved hosts comprises a document attached to a cryptographic signature produced by the second host.

17. The non-transitory computer readable storage medium of claim 14, wherein removing authentication credentials from the request comprises at least one of:
removing a session cookie that was previously issued by the web application;
removing all cookies that were previously issued by the web application; or
removing username and password information previously solicited by the web application in response to an HTTP authentication required error.

18. The non-transitory computer readable storage medium of claim 14, wherein the request is determined to be associated with suspicious activities when the request is triggered by an unsigned email message.

\* \* \* \* \*